(No Model.)
C. H. MILLER.
SPIRIT LEVEL AND INCLINOMETER.
No. 391,717. Patented Oct. 23, 1888.
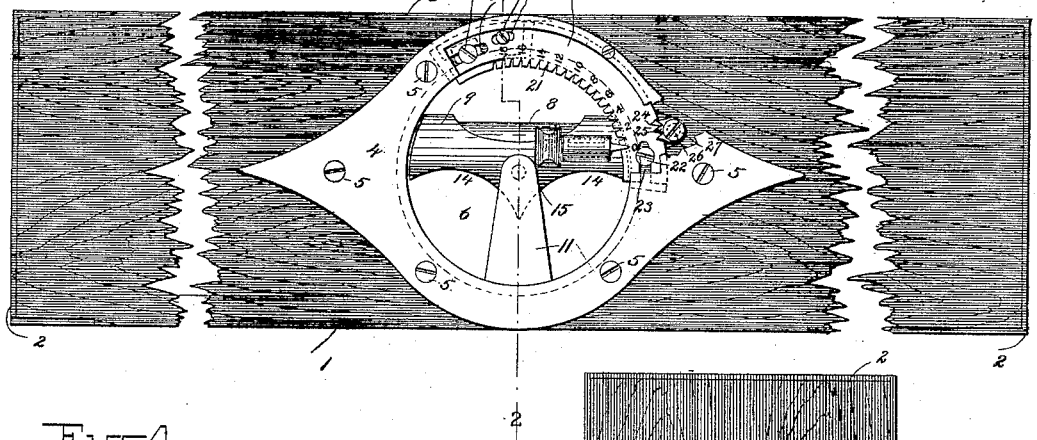
Witnesses.
John F. Nelson.
Mazie L. Bidgood
Inventor.
Charles H. Miller,
By Knight Bros.
Attorneys.

UNITED STATES PATENT OFFICE.

CHARLES HENRY MILLER, OF UNION CITY, OHIO, ASSIGNOR OF ONE-HALF TO ISAAC S. BRANDENBURG, OF PEORIA, ILLINOIS.

SPIRIT-LEVEL AND INCLINOMETER.

SPECIFICATION forming part of Letters Patent No. 391,717, dated October 23, 1888.

Application filed March 21, 1888. Serial No. 267,966. (No model.)

*To all whom it may concern:*

Be it known that I, CHARLES HENRY MILLER, a citizen of the United States, residing at Union City, county of Darke, and State of Ohio, have invented a certain new and useful Improvement in a Combined Plumb and Level, of which the following is a specification.

My invention relates to an improvement in those instruments which may be used at will either as a level or a plumb; and it consists in details of construction which will be first fully described with reference to the accompanying drawings, and then pointed out in the claims.

In the said drawings, Figure 1 is a side elevation of my improved instrument adjusted for use as a level, part of the side plate shown being broken away to show the mechanism for adjusting the gage. Fig. 2 is a transverse sectional view of the same on the line 2 2, Fig. 1. Fig. 3 is a side view showing the instrument as arranged for use as a plumb, part of the gage being broken away to show the adjustable stop used for retaining the level in its position. Fig. 4 is an enlarged detail.

1 represents the level-stock protected by plates or ferrules 2 at the ends and by a top plate, 3.

4 4 are the side plates fixed on each side of the stock by screws 5, and surrounding the central aperture, 6, in the stock. One of the plates 4 is cut away, as shown, to exhibit the face of a scale, 7.

8 is the glass level carried by the level-bed 9. The bed 9 has cup-shaped trunnions 10, which turn in cup-shaped recesses at the center of radial arms 11, which are fixed by screw 12 to the rim 13. The level-bed is made with the cut-away portions 14 and projection 15, to render it capable of easy operation by the fingers. On one face of the level-bed is fixed or formed a housing, 16, for a bolt, 17, projected by spring 18, and retracted by thumb-piece 19, retained upon the bolt by set-screw 20. The nose of the bolt 17 engages in a series of notches, 21, on the inner edge of the gage or scale 7. The notches are numbered upward from 0 at the level to 18, or other number, according to the size of the stock or the amount of inclination which the level is to be capable of measuring. The scale is fixed to the stock or to the rim 13 by screws 22, passing through slots 23. The set-screws may be loosened when it is desired to correct the adjustment of the scale when it has been dislodged by accident, or otherwise. For this purpose the rear edge of the scale is provided with teeth or notches 24, with which segment-rack 25 engages. This rack is carried by a pin, 26, operated by a thumb or screw head, 27.

Under the scale 7 is fixed a short plate, 28, having a notch, 29, forming a stop for the bolt 17 when the level is in the position shown in Fig. 3 to be used as a plumb. This plate has a slot, 32, corresponding with the contiguous slot 23 of the scale, through which the screw 22 passes, and is also fixed to the scale 7 by screw 30 in slot 31, and is independently adjustable, so as to allow it to be fixed to the exact position without regard to the adjustment of the scale. Either of the parts 7 and 28 are brought to the proper position after first putting the nose of the bolt 17 either in the zero-notch of the scale or the single notch of the plate 28.

The graduations on the scale are for the purpose of fixing the amount of inclination of any object or surface against which the instrument is laid to aid in rendering other bevels or slopes uniform therewith. The fact that the graduations are not of such size as to give the number of degrees or inches per foot of the inclination does not lessen its usefulness for this purpose. Having once determined and fixed the inclination for one surface—such as that of a foundation or floor—the level is set at the appropriate angle and so used in fixing the remainder of the surface or other corresponding surfaces.

It will be seen that when the bolt 17 is set at 0 on the gage plate or scale 7 the instrument may be used as a level, or if it be desired to measure the angle of inclination of any surface the stock may be placed against the surface, and the level being turned till it attains a horizontal position the bolt will indicate on the scale the angle; or if the numbers be properly spaced the bolt will indicate the altitude of the upper end of the stock; or if the instrument is to be used as a plumb the level need only be turned so that its bolt will engage in the notch 29 of plate 28.

In case the level-glass should be broken, it may be removed and replaced by another on taking off one of the side plates, removing the screw which holds the trunnion-arms and extracting the level-bed.

Having thus described my invention, the following is what I claim as new therein and desire to secure by Letters Patent:

1. The combination of the stock, the side plates fixed thereto and surrounding an opening in said stock, the rim, the arms projecting from the rim, and a level carried by the arms, substantially as described.

2. The combination of the stock, the side plates fixed thereto and surrounding an opening in said stock, the rim, the arms projecting from the rim having cup-shaped recesses, and a level having cup-shaped trunnions, substantially as described.

3. The combination of the stock, the rim, the level, the arms, and the screw securing said arms to the rim, substantially as described.

4. The combination of the stock, the arms, and the level carried by the arms having a bed formed with cut-away portions 14, and a central projection, 15, substantially as described.

5. The combination of the stock, the arms, the level carried by the arms having a bed provided with a housing, the bolt in the housing, and a notched stop-plate, substantially as described.

6. The combination of the stock, the arms, the level carried by the arms having a bed provided with a housing, the bolt in the housing having a nose and thumb-piece, and the notched scale, substantially as described.

7. The combination of the stock, a pivoted level having a bolt, an adjustable notched scale having slotted ends, and the set-screws for securing the scale, substantially as described.

8. The combination of the stock, a pivoted level having a bolt, an adjustable stop-plate having slotted ends, and set-screw for securing the stop-plate, substantially as described.

9. The combination of the stock, the level, the scale, and a segment-rack for adjusting the scale, having means of operation substantially as described.

10. The combination of the stock, the level, the scale having teeth, the rack-segment engaging the teeth, and a set-pin carrying the rack-segment, substantially as described.

11. The combination of the stock, the level, the notched scale having slot 31, and end slots, 23, the set-screws 30 and 22, and the stop-plate 28, having a slot, 32, substantially as described.

12. The combination of the stock, the level, the notched scale formed with slot 31, end slots, 23, and teeth 24, the pin 26, having rack-segment 25, and the short plate 28, having slot 32, and stop-notch 29, substantially as described.

CHARLES HENRY MILLER.

Witnesses:
JAMES B. MCKENZIE,
MORTON H. LAMBERT.